INVENTOR:
George R. Luckey
George R. Crane
By Alan C. Rose
Attorney

Aug. 25, 1964 G. R. LUCKEY ETAL 3,145,942

SHOCK PROOF TAPE HANDLING APPARATUS

Filed Feb. 9, 1961 4 Sheets-Sheet 2

INVENTOR:
George R. Luckey
George R. Crane
By Alan C. Rose
Attorney

Aug. 25, 1964 G. R. LUCKEY ETAL 3,145,942

SHOCK PROOF TAPE HANDLING APPARATUS

Filed Feb. 9, 1961 4 Sheets-Sheet 3

INVENTOR:
George R. Luckey
George R. Crane

By Alan C. Rose
Attorney

Aug. 25, 1964 G. R. LUCKEY ETAL 3,145,942

SHOCK PROOF TAPE HANDLING APPARATUS

Filed Feb. 9, 1961 4 Sheets-Sheet 4

INVENTOR:
George R. Luckey
George R. Crane

By Alan C. Rose
Attorney

② United States Patent Office — 3,145,942 — Patented Aug. 25, 1964

3,145,942

SHOCK PROOF TAPE HANDLING APPARATUS

George R. Luckey, North Hollywood, and George R. Crane, Santa Monica, Calif., assignors to Litton Systems, Inc., a corporation of Maryland Filed Feb. 9, 1961, Ser. No. 88,123
14 Claims. (Cl. 242—55.12)

This invention relates to tape handling apparatus, and more particularly, to a shock and vibration proof tape recording or reproducing apparatus.

For conditions involving severe mechanical shock, it is desirable to have a tape recorder which will operate properly despite shocks of up to several hundred times the force of gravity. Conventional tape recorders fail, and are inoperative at much lesser forces than 50 or 100 *g*'s, where the designation "*g*" will be employed to indicate the acceleration of gravity. Furthermore, the massive nature of components for use in a device which must withstand shocks of this type, would normally be such that the apparatus would be undesirably bulky.

Accordingly, the principal object of the present invention is to increase the shock and vibration resistance of a tape handling apparatus while concurrently minimizing its size.

In accordance with the present invention, compactness is achieved by a generally circular arrangement of the parts with the driving motor centrally located, and other major components located around the motor. In addition, the tape is directed around the outside of the pay-out and take-up reels, the recording or reading head, and the tape driving mechanism. With this arrangement, the tape virtually encloses these key active units of the tape handling apparatus.

To achieve high vibration resistance, tape guide members have been provided which support the tape between the active units of the apparatus, so that extended unsupported sections of tape are avoided. One of these guide members performs the collateral functions of burnishing the tape, and of providing substantially uniform tape tension as the tape is transferred from one reel to the other. Other features which contribute to vibration resistance include the gear drive for the tape and the shock resistant construction of the rubber-coated roller employed in the tape drive mechanism.

To indicate the effectiveness of the present design, the recording unit has been successfully operated to pull tape while subjected to square wave shocks involving peak accelerations of over 1000 times the acceleration of gravity. This is in comparison with accelerations of ten or twenty *g*'s which are the highest accelerations which a human being can survive.

Other objects, features and advantages will become apparent from a consideration of the following detailed description and from the accompanying drawings, in which.

Figure 1:
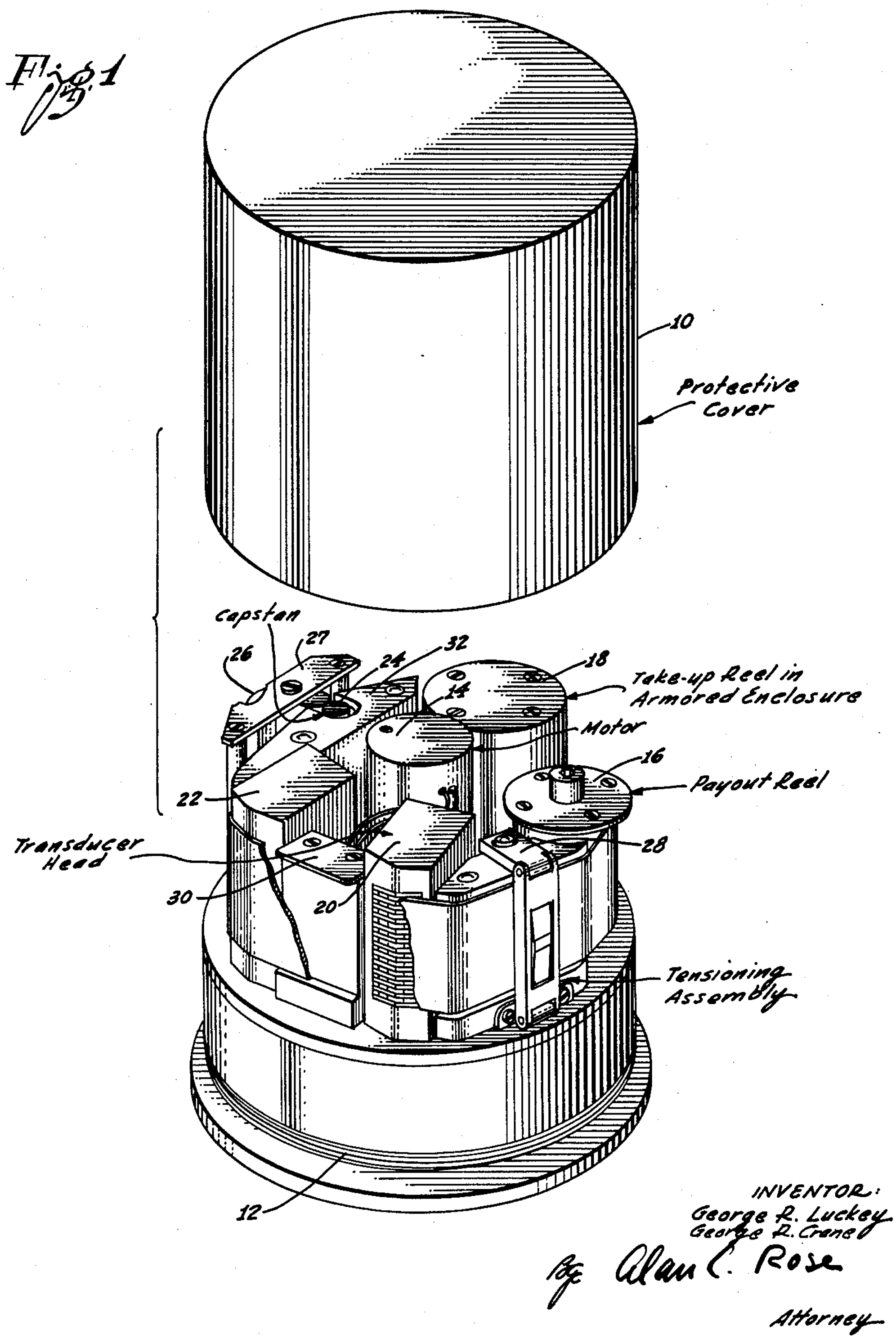
FIG. 1 is an isometric view of the tape handling apparatus is accordance with the present invention, with the cover shown in a raised position.

With reference to the drawing, in FIG. 1 the armored enclosure 10 of the apparatus is shown unscrewed from the threads 12 with which it would normally be engaged. With the cover 10 raised the various components of the shockproof recording apparatus of the invention are clearly visible. The configuration of components is generally circular, with the motor 14 being centrally located. The other major components include the pay-out reel 16, the take-up reel assembly 18, the two recording heads or transducers 20 and 22, the drive mechanism including the driven capstan 24 and the counterbalanced pressure roller assembly 26, and the tape guides 28, 30, and 32.

The tape guides conduct the tape along the peripheral path which encompasses the major components of the recording unit. Thus, the tape is unreeled from the outer side of the pay-out reel 16 through the guide component 28 past the recording head 20, through the tape guide 30, past a second transducer 22, and along the tape guides 32 through the driving mechanism 24, and 26. From the driving mechanism and the tape guides 32, the tape is wound onto the outer side of the take-up reel 18 through a slot in its armored enclosure.

By the configuration of the units as noted above and shown in FIG. 1, a compact arrangement is possible. In this regard, it may be noted that the configuration is characterized by the location of the major units of the recorder peripherally with respect to the central motor 14. In addition, the geometry is characterized by the encircling of the major components by the tape as it is pulled from the pay-out reel 16 to the take-up reel 18.

Figure 2:
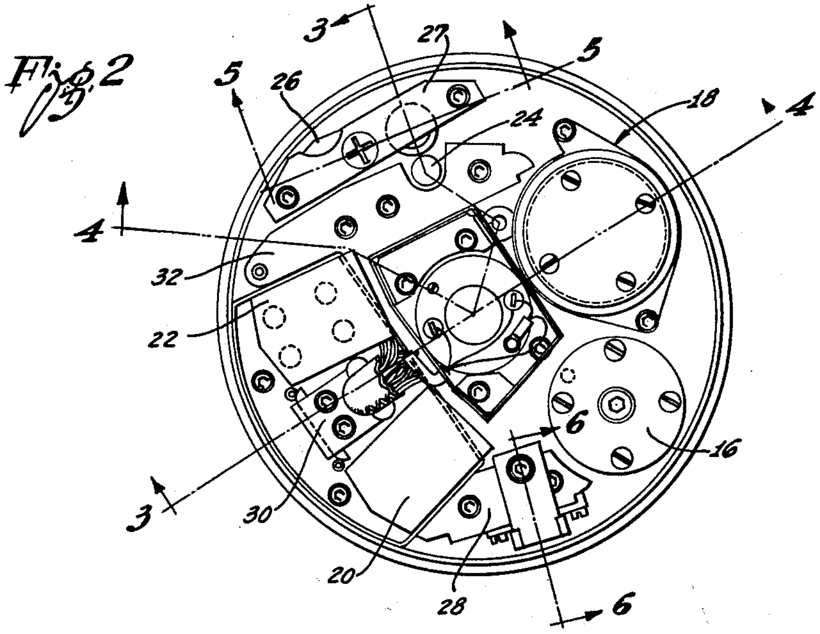
FIG. 2 is a top plan view of the apparatus, with the protective cover removed.

FIG. 2 is a plan view of the structure of FIG. 1, and the elements in this view bear reference numerals which correspond to those of FIG. 1. The subsequent figures of the drawings are cross-sectional views oriented as indicated by the dash-dot lines in FIG. 2 and by reference numerals corresponding to the subsequent figure numbers. In connection with FIG. 2, it may be noted that the support 27 for the pressure roller assembly 26 is spaced from the guide 32 for ease in threading the tape.

Figure 3:
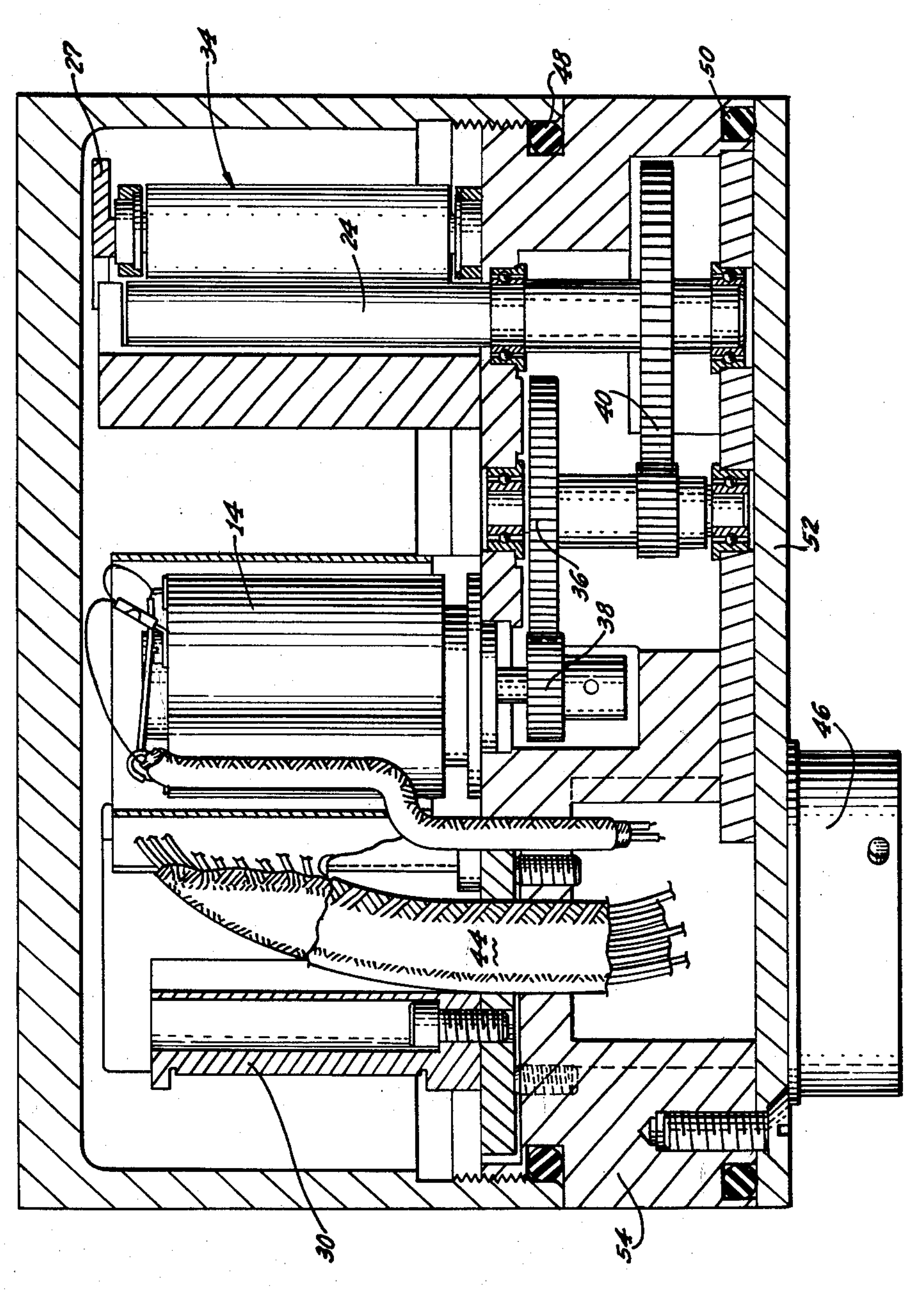
FIG. 3 is a cross-sectional view of the tape handling apparatus taken along lines 3—3 of FIG. 2.

FIG. 3 is a cross-sectional view taken along lines 3—3 of FIG. 2. It may be noted that the cross section is not a true diametral cross section, or even a pair of radial cross sections, but instead, extends through the centers of the pressure roller 34 and the capstan 24, as well as through the center of the gear 36 included in the gear train which drives capstan 24.

An interesting feature of the present invention which is shown in FIG. 3 is the gear train mechanism mentioned above. Normally, gears are not employed in recording mechanisms because of the variation which they might produce in the speed at which the tape is pulled; however, it has been found for the present purposes, in which resistance to the shock and vibration are paramount, that precision gears may be employed which do not interfere unduly with the constant rate at which the tape is pulled. The gear train includes the precision gear 38 secured to the shaft of the motor 14, the additional pair of gears on the assembly 36, and another gear 40 secured to the shaft on which the capstan 24 is mounted. The gear train provides a reduction from the high speed of 10,000 to 13,000 revolutions per minute at which the motor 14 rotates to the desired tape speed of 15 to 20 inches per second at which the outer surface of the capstan 24 moves.

The tape is not shown in FIG. 3 but would, of course, be driven by the pressure of roller 34 against the capstan 24. The roller 34 has a thin tubular rubber sleeve cemented to its outer surface. This rubber sleeve is only 0.08 inch in thickness. In this regard it may be noted that the thick rubber "pucks" which are normally used in tape driving mechanisms are a source of failure at the high levels of shock and vibration for which the present apparatus is designed. More specifically, it has been found that these prior art pucks tend to shred to pieces under severe mechanical conditions. Through the use of a thin tubular sleeve of silicone rubber which is stretched to slip over the roller 34, and which is cemented to it, the difficulties encountered with the conventional thick rubber pucks are avoided.

Other elements which are visible in FIG. 3 include the bundle of wires 44 which is connected to the outlet connector 46, the tape guide 30, the O-ring seals 48 and 50, and the lower coverplate 52 which is secured to the bottom of the apparatus. The gears and the active units of the recorder are secured to a heavy supporting housing 54 which provides rigidity for the entire assembly.

Figure 4:
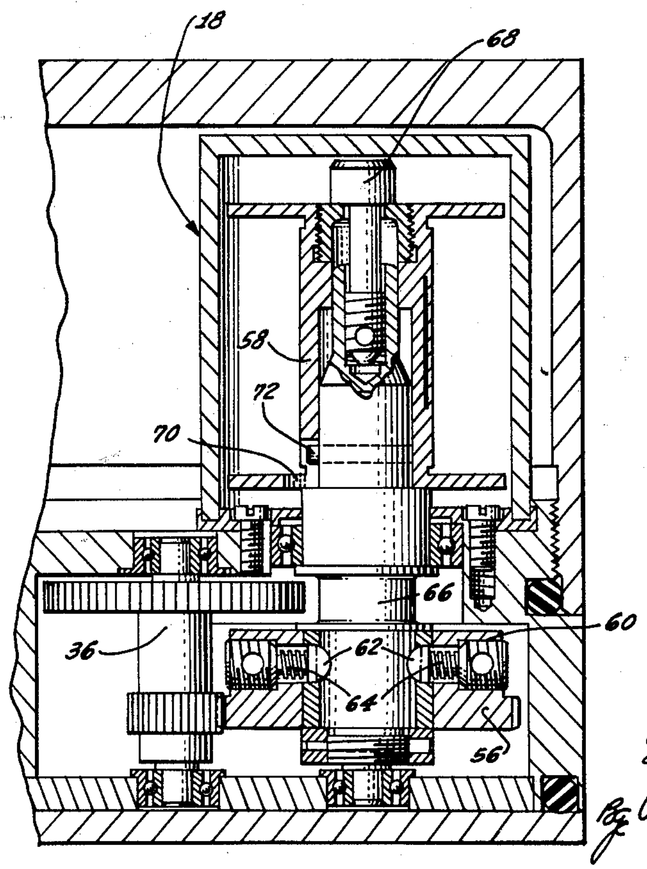
FIG. 4 is a cross-sectional view of the take-up reel and its associated housing and drive mechanism taken along lines 4—4 of FIG. 2.

As noted above, FIG. 4 is a partial cross-sectional view taken along lines 4—4 of FIG. 2. FIG. 4 shows the details of the take-up reel drive mechanism and the take-up reel mounting arrangements. With regard to the drive mechanism for the take-up reel, it includes the gear 36 which is also shown in FIG. 3 and the driving gear 56 which is aligned with the take-up reel assembly 18.

For proper recording the tape must be advanced at a constant rate; accordingly, it is not practical to pull it by means of the drive to the take-up reel, as the tape speed would change as the effective diameter of the reel increases. The capstan and the rubber-coated roller are therefore employed to drive the tape at a constant speed. In order to maintain constant tension from the capstan 24 to the take-up reel 58, the reel is overdriven by means of a friction clutch mechanism 60. The friction clutch includes the friction elements 62 which are biased by spring members 64 into engagement with the shaft 66 to which the reel is secured. As the gear 56 is driven by the gear train, the shaft 66 will be rotated by virtue of the engagement of the friction elements 62 with shaft 66. In the absence of a tape on the reel 58, the spool would rotate at a higher speed at its surface than the 15-inch-per-second speed of the tape; accordingly, when it is slowed by the tape-drive mechanism, the shaft 66 will rotate with respect to the gear train 56 and the reel 58 will rotate at the proper speed to maintain a proper value of tension on the tape.

The reel 58 is secured to the shaft 66 by the bolt 68. Relative rotation of the reel 58 and the shaft 66 is prevented by the engagement of slot 70 by the pin 72, which is secured to shaft 66.

Figure 5:
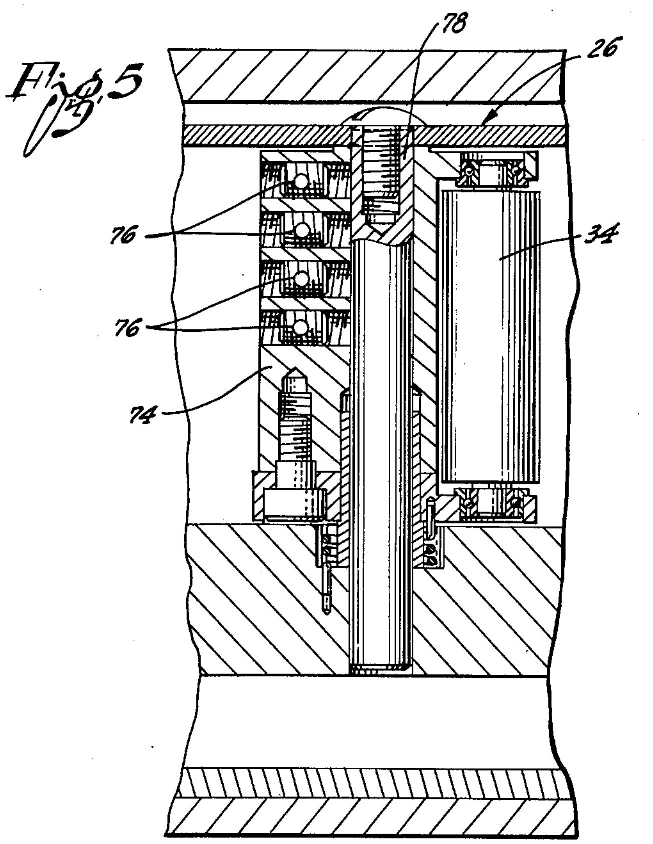
FIG. 5 is a cross-sectional view of the counter-balanced pressure roller assembly taken along lines 5—5 of FIG. 2 of the drawing.

The cross-sectional view of FIG. 5 is taken along lines 5—5 of FIG. 2. FIG. 5 shows in some detail the construction of the counter-balanced pressure roller assembly 26. This assembly includes the roller 34 and the counterbalance 74. The counterbalance 74 prevents movement of the roller 34 out of engagement with the tape when the unit is subjected to severe shocks. In addition to the nature of the roller 34 which has been discussed above, the counterblance 74 is of considerable interest; thus, it includes four screws 76 which are employed to statically balance the assembly 26 with respect to the axis of the mounting shaft 78. The adjusting screws 76 are held in position by nylon elements which engage the tapped holes in which the screws are mounted.

Figure 6:
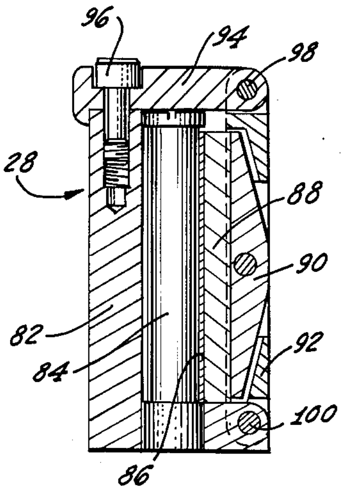
FIG. 6 is a cross-sectional view through the guiding and burnishing member taken along lines 6—6 of FIG. 2 of the drawings.

FIG. 6 of the drawing is a cross-sectional view of the tape guiding component 28 and is taken along lines 6—6 of FIG. 2. In addition to the tape guiding function, the component 28 serves to burnish the tape for smoother contact with the transducer heads, and also provides substantially uniform tape tension as the tape is pulled across the magnetic heads. The assembly 28 includes a supporting body 82, an eccentrically mounted shaft 84, a strip of felt material 86 for pressing the tape against the eccentric burnishing rod 84, and a backing layer of resilient material 88 which is mounted behind the felt 86. The layers of felt and resilient material are mounted on a pivoted support which includes the plate 90 and the two additional hinged support members 92 and 94. In order to thread the tape through assembly 28, the screw 96 must first be removed. The plate 94 is then tilted about pivot point 98 and plate 92 is hinged forward at pivot point 100. After threading the tape against the hardened burnishing rod 84, the support plates 92 and 94 are pivoted back into position and the screw 96 is tightened down. The tape is then held between the felt material 86 and the rod 84. The tension provided by assembly 28 may be adjusted by rotating the rod 84.

As noted above, the assembly 28 provides essentially constant tension as the tape is reeled from the pay-out spool 16 to the take-up reel 18. With this arrangement, the drag provided by the braking mechanism secured to the shaft of pay-out reel 16 may be reduced to a low level. In passing, it may be noted that the tension resulting from the braking arrangements associated with the shaft of the pay-out reel varies. Thus, when the reel is full, there is a relatively long effective lever arm and the tension is relatively low. As the reel is emptied, however, the lever arm is reduced and the tension on the tape increases significantly.

In the case of the assembly 28 of FIG. 6 in which a frictional force is applied directly to the tape, however, a constant tension is provided throughout the cycle of the tape handling apparatus. Accordingly, the combination of the two tape tensioning arrangements may be adjusted so that the drag provided by apparatus 28 predominates, and the overall tension applied to the tape does not change to any significant extent.

With regard to an alternative structure which may be employed to guide the tape, another form of guide may be substituted for the tape guide 30 as shown in FIG. 1. The alternative structure could be mounted outside of the tape, instead of within the space enclosed by tape. The alternative guide would retain the U-shaped configuration indicated by the guide 30 of FIG. 1, but would have the tape bearing surface adjustable in the manner indicated by the pivoted member 90 shown in FIG. 6. The tape is only one-thousandth of an inch in thickness and cannot readily be guided from its edges. By changing the surface angle of the tape guide, through suitable adjusting screws or the like, however, undesired lateral movement of the tape may be avoided.

The recorder as described above has been subject to severe tests, which involved pulling tape during the course of several high acceleration tests, which included accelerations above 1,000 times the acceleration of gravity. In addition, the unit has withstood a square pulse acceleration of 500 times the acceleration of gravity for 15 milliseconds, with the acceleration being directed along the axis of the cylindrical unit. It also withstood and continued to pull tape during the course of two shocks of 750 times the acceleration of gravity lasting for 8 milliseconds in a direction perpendicular to the axis of the unit. Of these last two tests, acceleration was directed parallel to a line passing through the center of the apparatus and through one of their recording heads in one of the tests, and perpendicular to this direction in the other test.

The structural features of the invention which contribute to the compactness and shock resistance of the present tape handling apparatus include the armored enclosure or protective cover for the entire unit, the additional inner armored enclosure for the take-up reel, and the peripheral arrangement of parts, encircling the centrally-located motor. The method of supporting and guiding the tape preferably with no unsupported lengths of tape greater than one-half inch is also important. With regard to tape-handling, the use of adjustable guides in engagement with the tape, which adjust about a central point as shown in FIG. 6, are particularly helpful in controlling the tension and avoiding lateral movement of the tape. Other features of the invention include the gear-driving arrangements and associated frictional overdrive for the take-up reel.

It is to be understood that the above-described arrangements are illustrative of the application of the principles of the invention. Numerous other arrangements may be devised by those skilled in the art without departing from the spirit and scope of the invention.

What is claimed is:

1. A compact shock and vibration proof tape recorder comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, and means including tape guides extending between said reels, said head and said capstan for supporting said tape so that no unsupported lengths of tape greater than one-half inch are present, and the density of component spacing being such that no component is spaced from the next adjacent component by more than the width of said tape.

2. A compact shock and vibration proof tape handling apparatus comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, a cylindrical pressure roller, said pressure roller being of rigid mechanical construction with a layer of rubber less than 0.1 inch thick on its outer surface, means for dynamically counterbalancing said pressure roller, means for biasing said pressure roller into engagement with said tape opposite said capstan, and means including tape guides extending between said reels, said head and said capstan for supporting said tape so that no unsupported lengths of tape greater than one-half inch are present.

3. A compact shock and vibration proof tape handling apparatus comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, a centrally mounted motor, precision gear train means for driving said capstan, and means including a friction clutch interconnecting said gear train and said take-up reel for overdriving said take-up reel.

4. In a compact shock and vibration proof tape handling apparatus, a central driving motor; a plurality of units including a pay-out reel, a tape transducer, a driving capstan and a take-up reel located peripherally and closely spaced about said motor; and means for guiding the tape around said units to enclose them and the motor, said means including tape guides for supporting said tape so that no unsupported lengths of tape greater than one-half inch are present.

5. In a compact shock and vibration proof tape handling apparatus, a central driving motor; a plurality of units including a pay-out reel, a tape transducer, a driving capstan and a take-up reel located peripherally about said motor; and means including tape guides between said units, for guiding the tape around said units and motor to enclose them.

6. A compact shock and vibration proof tape handling apparatus comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, a cylindrical pressure roller biased into engagement with said tape opposite said capstan, said pressure roller being of rigid mechanical construction with a layer of rubber less than 0.1 inch thick on its outer surface, means for counterbalancing said pressure roller, means including tape guides extending between said reels, said head and said capstan for supporting said tape so that no unsupported lengths of tape greater than one-half inch are present, a centrally mounted motor, precision gear train means for driving said capstan, and means including a friction clutch interconnecting said gear train and said take-up reel for overdriving said take-up reel.

7. A compact shock and vibration proof tape recorder comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, a centrally mounted motor, precision gear train means for driving said capstan, and means including a friction clutch and an additional gear mounted coaxially with said take-up reel for overdriving said take-up reel, said additional gear being in driving engagement with said gear train.

8. A compact shock and vibration proof tape handling apparatus comprising a generally circular casing, take-up and pay-out reels mounted adjacent one-another for receiving and discharging tape adjacent the periphery of said casing, at least one transducer head mounted to engage said tape near the periphery of said casing, a driving capstan mounted to engage said tape between said head and said take-up reel, a cylindrical pressure roller biased into engagement with said tape opposite said capstan, said pressure roller being of rigid mechanical construction with a layer of rubber less than 0.1 inch thick on its outer surface, means for counterbalancing said pressure roller, and means including tape guides extending between said reels, said head and said capstan for supporting said tape so that no unsupported lengths of tape greater than one-half inch are present, one of said tape guides between said pay-out reel and said head comprising means for burnishing the tape in frictional contact with the tape.

9. A compact shock and vibration proof tape handling apparatus comprising: a casing, take-up, and pay-out reels mounted adjacent one another for receiving and discharging tape adjacent the periphery of said casing, at least one transducer head mounted to engage said tape near the periphery of said casing, a driving capstan mounted to engage said tape between said head and said take-up reel, a cylindrical pressure roller, means for dynamically counterbalancing said pressure roller, and spring means for biasing said pressure roller into engagement with said tape opposite said capstan.

10. A compact shock and vibration proof tape handling apparatus comprising: a base plate, a central driving motor; a plurality of units including a pay-out reel, a tape transducer, a driving capstan and a take-up reel mounted peripherally in close proximity around said motor on the same side of said base plate as said motor; and means including tape guides between said units for guiding the tape to each of said units.

11. A compact tape handling apparatus comprising:

a central motor having a longitudinal axis;

a pair of reels for storing tape located immediately beside said motor and having their axes parallel to that of said motor;

a transducer head mounted immediately adjacent said motor;

a driving capstan also located near said motor; and means for guiding said tape from one of said reels to the other around all of the above mentioned components, said guiding means also being located principally within the space enclosed by said tape, to provide a high density package of closely spaced tape handling components.

12. A compact tape handling apparatus comprising:

a mounting plate;

a central motor mounted on said plate;

a pair of reels for storing tape located on said plate immediately beside said motor;

a transducer head mounted on said plate immediately adjacent said motor;

a driving capstan also located near said motor; and means for guiding said tape from one of said reels to the other around all of the above mentioned components, said guiding means also being located principally within the space enclosed by said tape, to provide a high density package of closely spaced tape handling components.

13. A compact tape handling apparatus comprising:

a mounting plate;

a central motor mounted on said plate;

a pair of reels for storing tape located on said plate immediately beside said motor;

a transducer head mounted on said plate immediately adjacent said motor;

a driving capstan also located near said motor;

means for guiding said tape from one of said reels to the other around all of the above mentioned components, said guiding means also being located principally within the space enclosed by said tape, to provide a high density package of closely spaced tape handling components; and means located on the other side of said plate for driving said reels and capstan from said motor.

14. In a compact shock and vibration proof tape handling apparatus:

a central driving motor;

a plurality of units including a pay-out reel, a transducer head, a driving capstan, and a take-up reel, located peripherally about said motor;

means for reeling said tape onto said take-up reel and means for applying substantially uniform tension to the tape as the tape is transferred from one reel to the other, said tensioning means comprising a torque drag on the shaft for the pay-out reel and a tape burnishing mechanism including a hardened rod fixed against rotation with the tape and located on the transducer head side of the tape and means opposite said hardened rod for pressing said tape against said rod, said burnishing mechanism being located between the pay-out reel and the transducer head; and means for guiding the tape around said units and said motor to enclose them and the motor.

References Cited in the file of this patent

UNITED STATES PATENTS

| | | |
|---|---|---|
| 2,764,012 | Dooley | Sept. 25, 1956 |
| 2,858,996 | Switzer | Nov. 4, 1958 |
| 2,894,702 | Heath et al. | July 14, 1959 |
| 2,913,537 | Newman | Nov. 17, 1959 |
| 2,953,312 | Munroe | Sept. 20, 1960 |
| 2,957,049 | Uritis | Oct. 18, 1960 |
| 2,958,477 | James et al. | Nov. 1, 1960 |
| 2,989,265 | Selsted | June 20, 1961 |
| 2,998,177 | Romano | Aug. 29, 1961 |